US012710644B2

(12) United States Patent
Cole et al.

(10) Patent No.: US 12,710,644 B2
(45) Date of Patent: Aug. 18, 2026

(54) COMPACT HEAD-UP DISPLAY AND PUPIL EXPANDER THEREFOR

(71) Applicant: Dualitas Ltd, Milton Keynes (GB)

(72) Inventors: Alexander Cole, Milton Keynes (GB); Rakesh Maharjan, Milton Keynes (GB); Neil Collings, Milton Keynes (GB); Celedonia Krawczyk, Milton Keynes (GB); Timothy Smeeton, Milton Keynes (GB); Yiren Xia, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 425 days.

(21) Appl. No.: 18/318,774

(22) Filed: May 17, 2023

(65) Prior Publication Data

US 2023/0418053 A1 Dec. 28, 2023

(30) Foreign Application Priority Data

Jun. 28, 2022 (GB) ...................................... 2209449

(51) Int. Cl.
*G02B 27/00* (2006.01)
*G02B 27/01* (2006.01)

(52) U.S. Cl.
CPC ..... *G02B 27/0081* (2013.01); *G02B 27/0103* (2013.01); *G02B 27/0172* (2013.01); *G02B 2027/0174* (2013.01)

(58) Field of Classification Search
CPC ............ G02B 27/0081; G02B 27/0103; G02B 27/0172; G02B 2027/0174; G02B 5/32;
(Continued)

(56) References Cited

U.S. PATENT DOCUMENTS 6,278,534 B1 8/2001 Ams
10,599,098 B2 3/2020 Favalora
(Continued)

FOREIGN PATENT DOCUMENTS

| | | | | |
|---|---|---|---|---|
| CN | 107918209 A | * 4/2018 | ........... G02B 6/0028 |
| EP | 2784569 A1 | 10/2014 | |
| GB | 2514658 A | * 12/2014 | ............... G02B 5/30 |

OTHER PUBLICATIONS

Extended European Search Report dated Dec. 1, 2023 for European Application No. EP23175452.4, 10 pages.
(Continued)

*Primary Examiner* — Collin X Beatty
(74) *Attorney, Agent, or Firm* — McDonnell Boehnen Hulbert & Berghoff LLP

(57) ABSTRACT

A display system comprises a two-dimensional pupil expander. The pupil expander comprises a first replicator, a coupling element and a second replicator. The first replicator is arranged to receive a holographic light field and replicate the holographic light field in a first direction. The holographic light field is diverging. The coupling element comprises a reflective-transmissive surface arranged to receive the output of the first replicator and a reflective surface, opposing the reflective-transmissive surface, in order to guide at least a portion of the holographic light field by internal reflection therebetween to an output port of the coupling element and to reduce the size of the holographic light field in a second direction. The second replicator has an input port arranged to receive the output of the coupling element and replicate the holographic light field in the second direction, wherein the second direction is perpendicular to the first direction.

19 Claims, 10 Drawing Sheets

(58) Field of Classification Search

CPC .... G02B 27/0944; G02B 27/18; G02B 27/42; G02B 2027/0105; G02B 2027/0123; G02B 27/0972; G02B 27/0977; G02B 2027/0109; G02B 2027/015; G02F 1/01; G02F 1/135; G02F 2203/12; G03B 21/00; G03H 1/22; G03H 1/2205; G03H 1/265; G03H 2001/2239; G03H 1/02; G09F 19/18

See application file for complete search history.

(56) References Cited

U.S. PATENT DOCUMENTS

| | | | | |
|---|---|---|---|---|
| 10,634,919 | B2 | 4/2020 | Alexander | |
| 10,690,916 | B2 | 6/2020 | Popovich | |
| 10,795,235 | B2 | 10/2020 | Frank | |
| 10,838,132 | B1 | 11/2020 | Calafiore | |
| 11,567,317 | B2 | 1/2023 | Christmas | |
| 2003/0165017 | A1 | 9/2003 | Amitai | |
| 2009/0015929 | A1 | 1/2009 | DeJong | |
| 2010/0066926 | A1 | 3/2010 | Tanijiri | |
| 2012/0002256 | A1 * | 1/2012 | Lacoste | G03H 1/22 359/489.08 |
| 2012/0224062 | A1 | 9/2012 | Lacoste et al. | |
| 2015/0153569 | A1 | 6/2015 | Yonekubo | |
| 2015/0355461 | A1 | 12/2015 | Kessler et al. | |
| 2016/0041387 | A1 | 2/2016 | Valera et al. | |
| 2017/0242249 | A1 | 8/2017 | Wall et al. | |
| 2017/0315358 | A1 | 11/2017 | Masuda | |
| 2017/0329137 | A1 | 11/2017 | Tervo | |
| 2018/0095284 | A1 | 4/2018 | Welch | |
| 2018/0210202 | A1 | 7/2018 | Danziger | |
| 2018/0284460 | A1 | 10/2018 | Cheng | |
| 2019/0101866 | A1 | 4/2019 | Georgiou | |
| 2019/0340435 | A1 | 11/2019 | Rabinovich | |
| 2020/0310130 | A1 | 10/2020 | Noguchi | |
| 2021/0026135 | A1 * | 1/2021 | Ishii | G02B 27/0101 |
| 2021/0055549 | A1 | 2/2021 | Chang | |
| 2021/0255459 | A1 | 8/2021 | Christmas | |
| 2021/0318537 | A1 | 10/2021 | Kim | |

OTHER PUBLICATIONS

Hainich and Bimber, Displays: Fundamentals and Applications, “NearEye Displays”, pp. 439-503 (2011).

Combines Search and Examination Report dated Dec. 29, 2022 for Great Britain Application No. GB2209449.4, 7 pages.

* cited by examiner

COMPACT HEAD-UP DISPLAY AND PUPIL EXPANDER THEREFOR

CROSS-REFERENCE TO RELATED APPLICATIONS

This application claims the benefit of priority of United Kingdom Patent Application No. 2209449.4 filed Jun. 28, 2022, which is hereby incorporated herein by reference in its entirety.

FIELD

The present disclosure relates to pupil expansion or replication, in particular, although not exclusively, for a diffracted light field comprising diverging ray bundles. More specifically, the present disclosure relates a display system comprising a waveguide pupil expander and to a method of pupil expansion using a waveguide. Some embodiments relate to two-dimensional pupil expansion. Some embodiments relate to a holographic projector, picture generating unit or head-up display, for example an automotive head-up display (HUD).

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

There is provided a display system. The display system comprises a first replicator arranged to receive a holographic light field and replicate the holographic light field in a first direction. The holographic light field is diverging. It may be said that the holographic light field comprises diverging ray bundles. The display system further comprises a coupling element. The coupling element comprises a reflective-transmissive surface, arranged to receive the output of the first replicator, and a reflective surface, opposing the reflective-transmissive surface, in order to guide at least a portion of the holographic light field by internal reflection therebetween to an output port of the coupling element and to reduce the size of the holographic light field in a second direction. The display system further comprises a second replicator having an input port arranged to receive the output of the coupling element. The second replicator is arranged to replicate the holographic light field in the second direction, wherein the second direction is perpendicular to the first direction.

Since the coupling element reduces the size (footprint) of the holographic light field in the second direction, use of the coupling element to optically couple the holographic light field into the second replicator has a number of advantages.

First, by virtue of the diverging holographic light field, the first replicator has a relatively large output port, in particular in a third direction orthogonal to the first and second directions, to accommodate the expanded/replicated and diverging holographic light field. Thus, conventionally, a correspondingly large input port of the second replicator is required. Since the coupling element reduces the size (footprint) of the holographic light field in the second direction, the width of the input port of the second replicator may be reduced in the second direction. Such a reduction in the size of the input port of the second replicator in the second direction—corresponding to the direction of pupil expansion by the second replicator—may improve optical coupling efficiency.

Secondly, the coupling element guides at least a portion of the holographic light field along its length from a first end to a second end. In particular, light ray bundles received at positions near the first end propagate along its length to the second end. Thus, all light ray bundles of the holographic light field received by the reflective-transmissive surface of the coupling element accumulate at the second end for output within the reduced light field size (footprint). In consequence, when the holographic light field comprises angular content (or angular hologram channels) as described herein, all the angular content may be coupled into the input port of the second replicator over a relatively short distance in the second direction. This, in turn, enables the size of the second replicator in the second direction to be more compact.

In some embodiments, the reflective-transmissive surface is a first major surface of the coupling element. The first major surface of the coupling element may form an input port of the coupling element. The input port of the coupling element may extend along substantially all of the first major surface of the coupling element. The output port of the coupling element may be relatively smaller than the input port of the coupling element (for example, may have a relatively smaller total surface area, width or depth than the input port of the coupling element). A width of the output port of the coupling may be less than half, optionally less than a quarter the width of the input port of the coupling element. Thus, the size of the holographic light field in the second direction is reduced from the width of the reflective-transmissive surface/width of the input port of the coupling element to the width of the input port of the coupling element.

In some embodiments, the output port of the coupling element is (formed by) an end surface of the coupling element. Thus, the size of the holographic light field in the second direction is reduced from the width of the reflective-transmissive surface/width of the input port of the coupling element to the width of the end surface of the coupling element.

In some embodiments, the output port of the coupling element is (formed by) a (first) portion of the first major surface of the coupling element. The (first) portion of the first major surface of the coupling element forming the output port of the coupling element may be relatively smaller than a (second) portion of the first major surface of the coupling element forming the input port of the coupling element. In some embodiments, the width of the (first) portion of the first major surface of the coupling element forming the output port of the coupling element may be less than half, optionally less than a quarter, the width of the (second) portion of the first major surface of the coupling element forming the input port of the coupling element. Thus, the size of the holographic light field in the second direction is reduced from the width of the (relatively wider) portion of the coupling element forming the input port to the width of the (relatively narrower) portion of the coupling element forming the output port. The first portion of the first major surface of the coupling element may not overlap the second portion of the first major surface of the coupling element. The first portion of the first major surface of the coupling element may be adjacent to the second portion of the first major surface of the coupling element.

In some embodiments, the coupling element is angled with respect to a propagation axis of the holographic light field received from the first replicator. Accordingly, the reflective-transmissive surface of the coupling element has a proximal (first) end and distal (second) end with respect to the first replicator. In some embodiments, it may be said that the reflective-transmissive surface provides an input port of the coupling element between the proximal and distal ends thereof. In some embodiments, the input port of the coupling element extends from the proximal end to the output port (which, in some embodiments, may be formed on the first major surface of the coupling element). In such embodiments, the output port of the coupling element may extend from the input port to the distal end of the coupling element.

In examples, the reflectivity/transmissivity of the reflective-transmissive surface of the coupling element is graded, for example the reflectivity increases from the proximal end to the distal end and/or the transmissivity decreases from the proximal end to the distal end. The graded reflectivity/transmissivity of the input port of the coupling element ensures that all the light ray bundles (which are incident at different angles/position on the input port) of the diverging holographic light field are fully coupled into the coupling slab. In addition, the graded reflectivity/transmissivity may be selected so that all the light ray bundles have the same intensity at the distal end of the coupling element for coupling into the second replicator. Thus, the holographic light field coupled into the second replicator has uniform intensity across its area.

In some embodiments, the size of the reflective-transmissive surface (e.g., between the proximal and distal ends thereof) of the coupling element substantially corresponds to the size (footprint) of the holographic light field incident thereon.

In some embodiments, the input port of the second replicator is reflective-transmissive. For example, the input port may comprise a reflective-transmissive element, such as a reflective-transmissive surface or surface coating. Optionally, the reflectivity of the reflective-transmissive element may be graded in the second dimension. The use of a partially reflective/partially transmissive input port at the second replicator enables efficient in-coupling and trapping within the second replicator of all rays of a divergent ray bundle incident on the input port.

In embodiments, the output port of the coupling element is at the second/distal end thereof. In some examples, the output port comprises a prism.

In some embodiments, each replicator of the first and second replicators comprises a pair of opposing surfaces arranged to waveguide therebetween by internal reflection. At least one of the pair of opposing surfaces of the first and/or second replicator may be partially transmissive—partially reflective such that a plurality of replicas of the holographic light field are emitted therefrom. The first and/or second replicator may be arranged such that the plurality of replicas of the holographic light field are emitted from a plurality of emission points or zones along a length of the respective first and/or second replicator.

In some embodiments, at least a portion of one of the pair of opposing (waveguiding) surfaces of the second replicator forms the input port of the second replicator.

In some embodiments, the second replicator has the form of a solid slab or block. In such embodiments, opposing first and second major surfaces of the second replicator may form the pair of opposing surface (arranged to waveguide therebetween by internal reflection). In some embodiments, the second replicator may comprise a first end face, extending between the first and second major surfaces. The first end face may be an end face of the second replicator closest to the coupling element. In some embodiments, a normal of the first end face may not be perpendicular to a normal of at least one of the pair of opposing (major) surfaces of the second replicator. In other words, an acute angle may be defined between one of the opposing surfaces of the second replicator and the first end face. Such an end face may have been formed as a result of chamfering the second replicator, for example. In such embodiments, the (angled) first end face may form the input port of the second replicator.

The width of input port of the second replicator (in the second direction) may be relatively smaller than the width of the output port of the first replicator. For example, the width of the input port of the second replicator may be at least half, optionally at least a quarter, the width of the output port of the first replicator. As above, this may be achieved as a result of coupling element reducing the size of the (footprint) of holographic light field.

In embodiments, the second replicator is substantially planar, and the first replicator and coupling element are substantially arranged in a layer/plane within the footprint of the second replicator (i.e., within an area that is the same size and is beneath the major surfaces of second replicator). This provides a compact arrangement for two-dimensional pupil expansion by the first and second replicators.

In some embodiments, the first direction and second direction correspond to dimensions of an eye-box of the display system.

The display system of embodiments further comprises a display device arranged to display a hologram and a light source arranged to illuminate the displayed hologram in order to form the holographic light field.

There is provided a head-up display comprising the display system. The head-up display may comprise an optical combiner that receives the output of the second replicator and directs it towards an eye-box. In examples, the head-up display is an automotive head-up display and the optical combiner comprises a windscreen (or windshield).

There is provided a coupling element, in particular an optical coupling element. The coupling element comprises a reflective-transmissive surface and a reflective surface, opposing the reflective-transmissive surface. The reflective-transmissive surface is arranged to receive a diffracted light field. The opposing reflective surface and reflective-transmissive surface are arranged to guide at least a portion of the diffracted light field by internal reflection therebetween to an output port.

In some embodiments, the coupling element is arranged to (optically) couple a first light field replicator to a second light field replicator. Accordingly, the holographic light field is received from the first replicator and coupled into the second replicator. The coupling element enables the size (footprint) of the holographic light field that is coupled into the second replicator to be reduced.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a "holographic light field" or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image. Whilst the present disclosure relates to holographic display systems, the skilled reader will appreciate that its teachings are applicable to other types of diffracted light field, in particular comprising diverging ray bundles.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 2 $\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
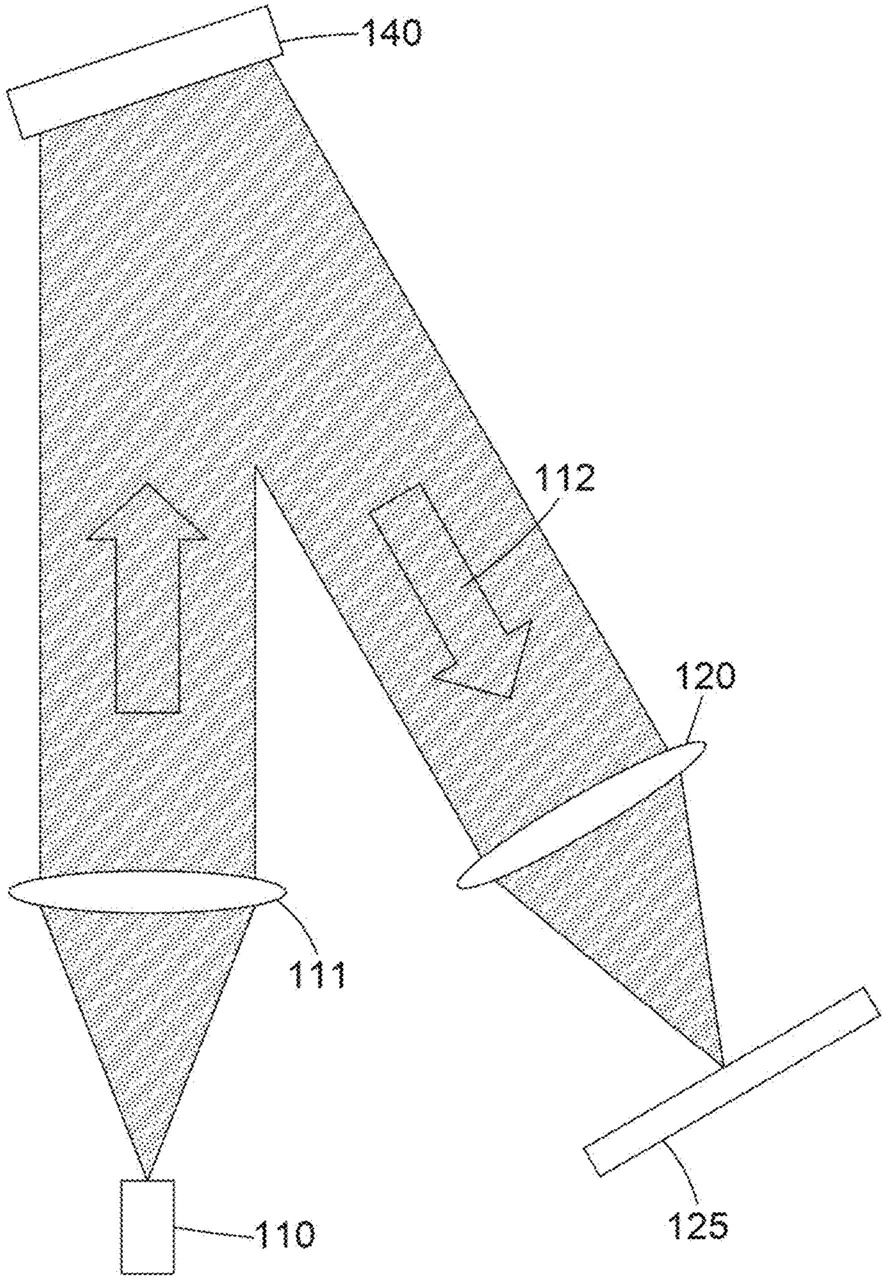
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 (published as GB2603517A) and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 (published as GB2610203A) and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
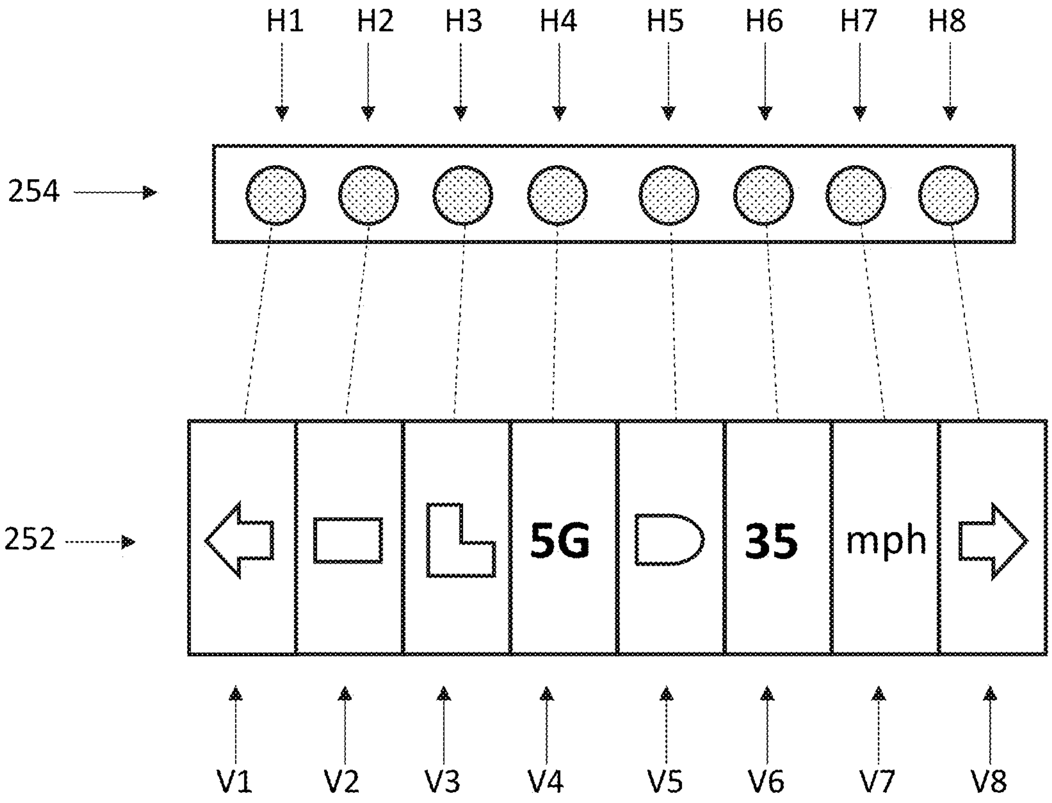
FIG. 2 shows an image for projection comprising eight image areas/components, V1 to V8, and cross-sections of the corresponding hologram channels, H1-H8.
Figure 3:
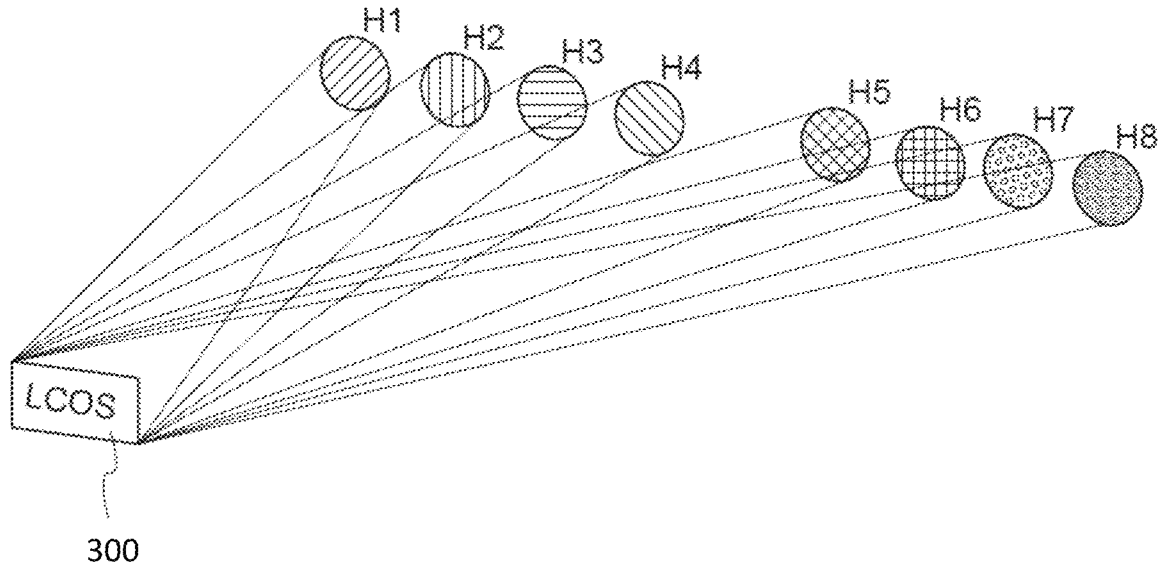
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
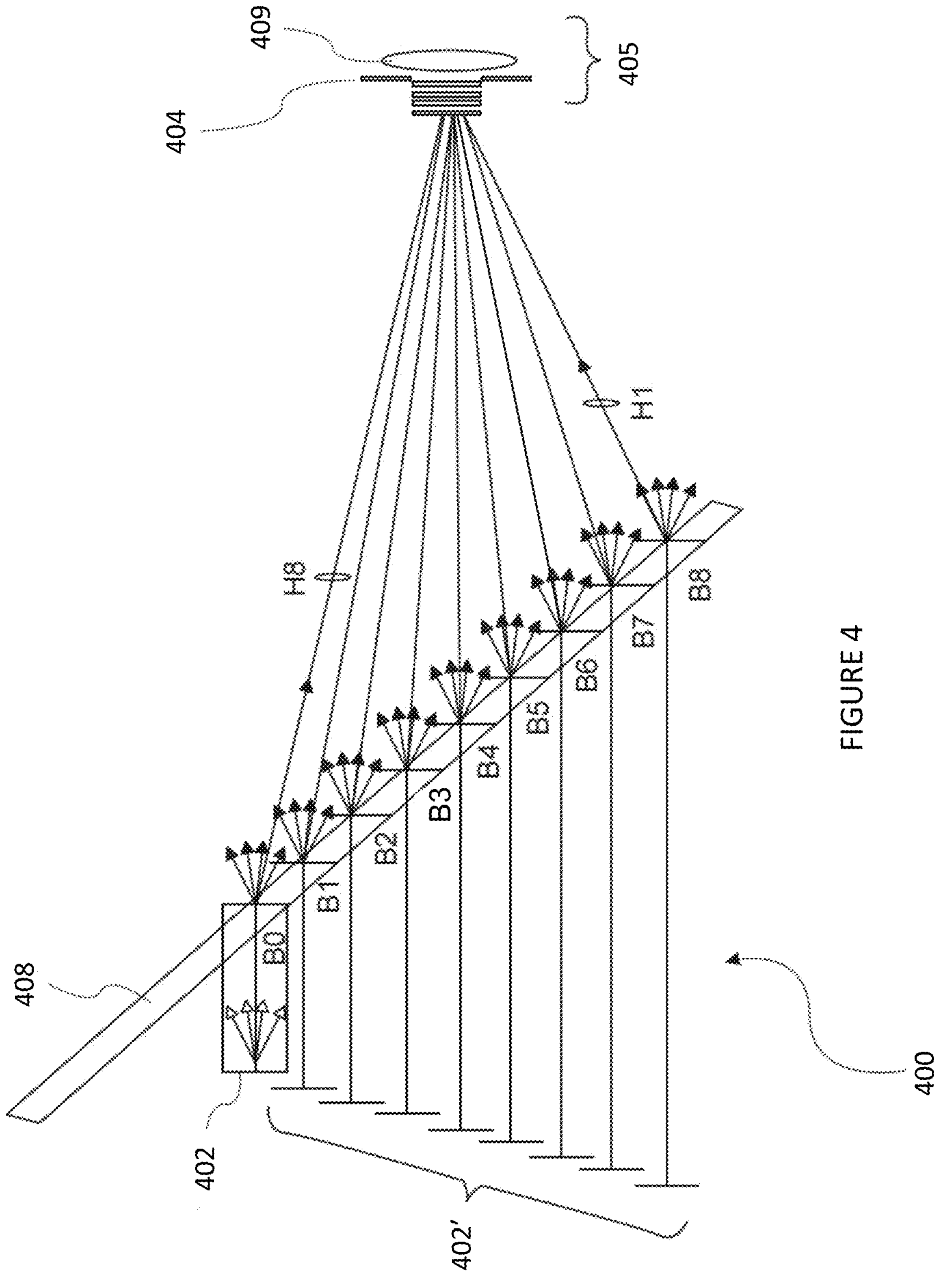
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

Although virtual images, which require the eye to transform received modulated light in order to form a perceived image, have generally been discussed herein, the methods and arrangements described herein can be applied to real images.

Two-Dimensional Pupil Expansion—Example 1

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
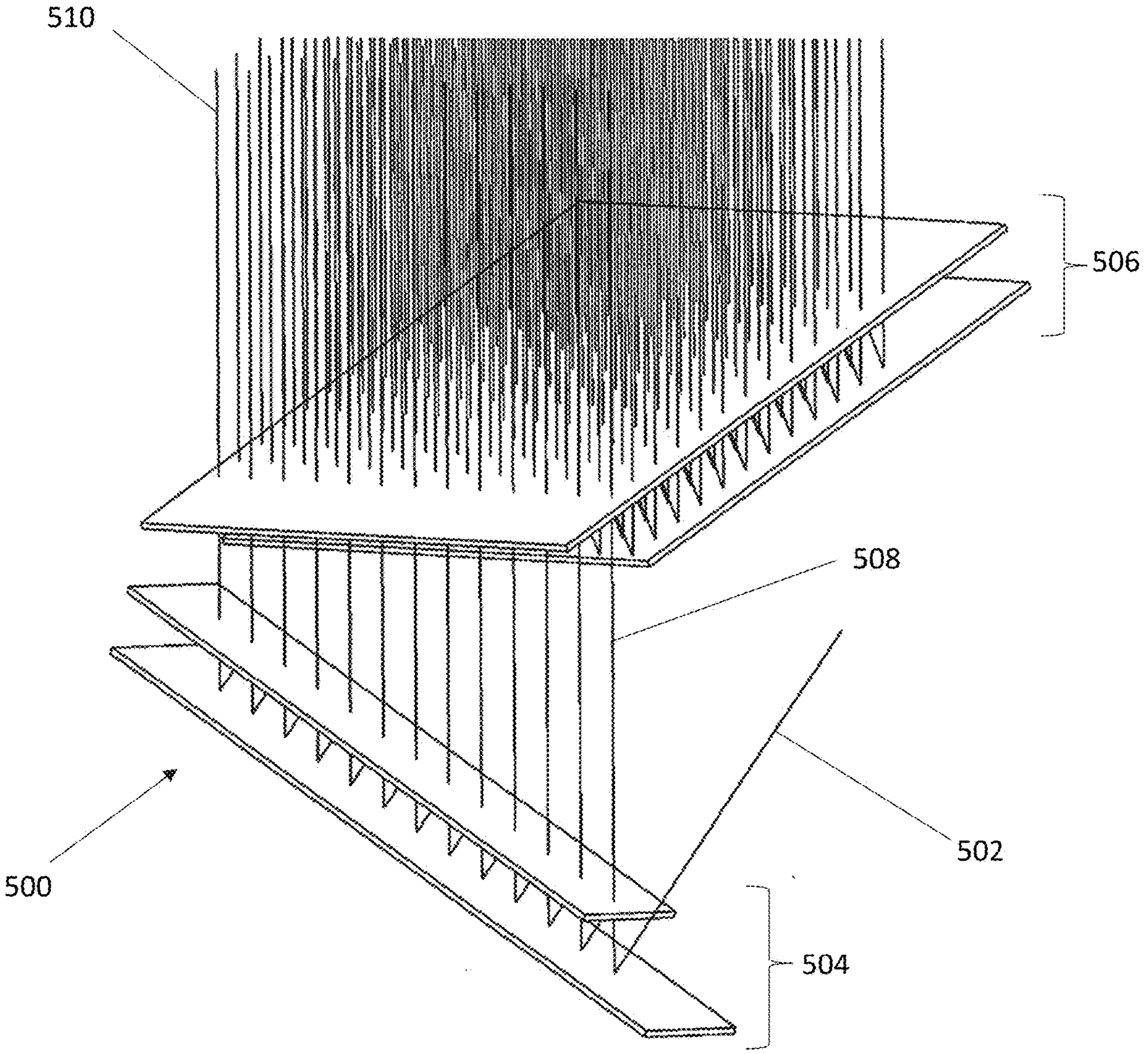
FIG. 5A shows a perspective view of a first example two-dimensional pupil expander comprising two replicators.

FIG. 5A shows a perspective view of a first example system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander").

Figure 5B:
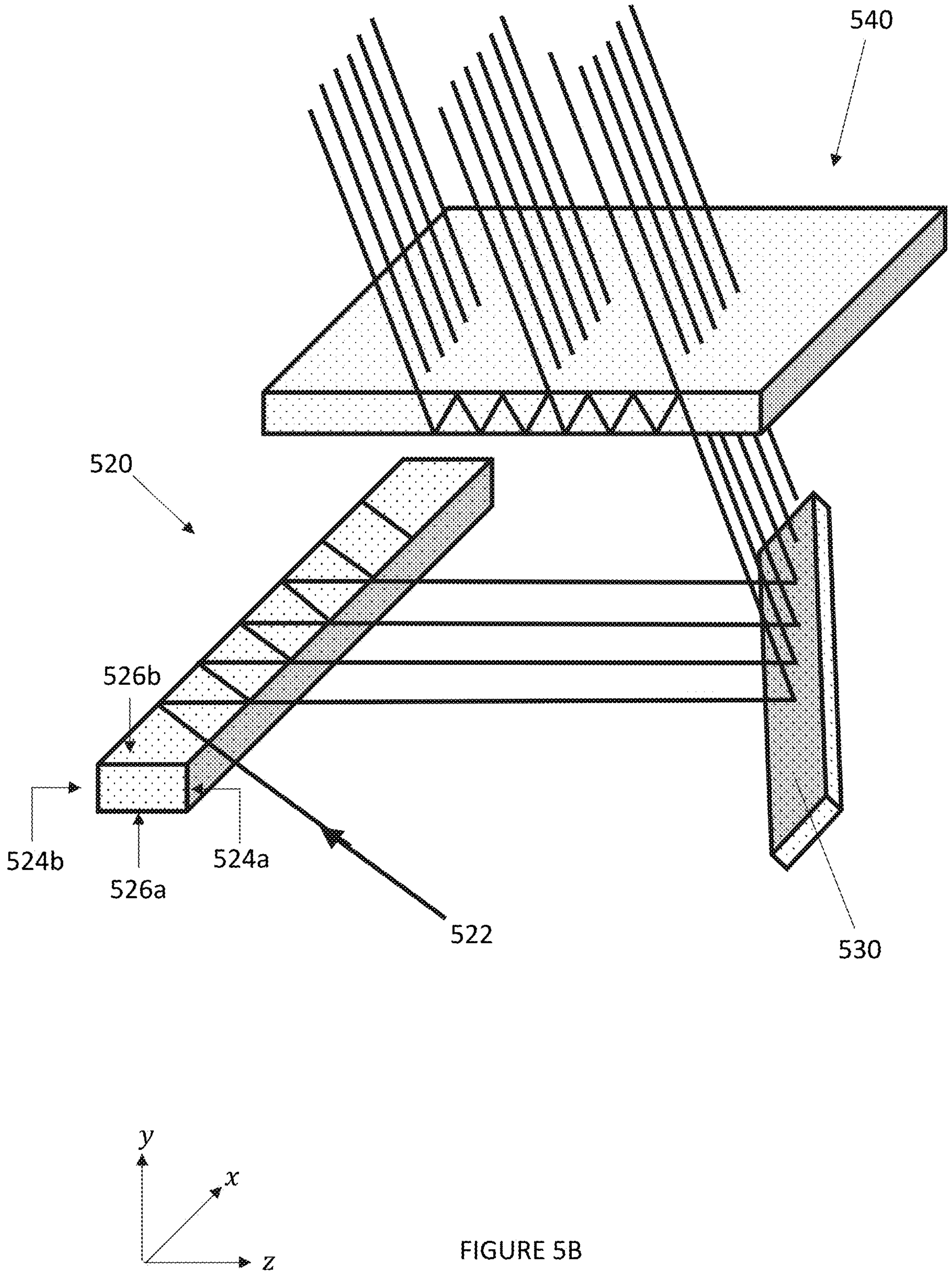
FIG. 5B shows a perspective view of a second example two-dimensional pupil expander comprising two replicators.

FIG. 5B shows a perspective view of a second example system 500 comprising two replicators 520, 540 arranged for expanding a light beam 522 in two dimensions.

In the second example system 500, the first replicator is a solid elongated waveguide 520 and the second replicator is a solid planar waveguide 540. In particular, the first replicator/waveguide 520 is arranged so that its pair of elongate parallel reflective surfaces 524*a*, 524*b* are perpendicular to the plane of the second replicator/waveguide 540.

The second example system 500 comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, mirror 530 is arranged to receive light—comprising a one-dimensional array of replicas extending in the first dimension—from the output port/reflective-transmissive surface 524*a* of the first replicator/waveguide 520. The mirror 530 is tilted so as to redirect the received light onto an optical path to an input port in the (fully) reflective surface of second replicator 540 at an angle to provide waveguiding and replica formation along its length in the second dimension.

In the illustrated arrangement, the reflective-transmissive surface 524*a* of the first replicator 520 is adjacent the input port of the first replicator/waveguide 520 that receives input beam 522 at an angle to provide waveguiding and replica formation along its length in the first dimension. Thus, the input port of first replicator/waveguide 520 is positioned at an input end thereof at the same surface as the reflective-transmissive surface 524*a*. The skilled reader will understand that the input port of the first replicator/waveguide 520 may be at any other suitable position.

Accordingly, the arrangement of the second example system enables the first replicator 520 and the mirror 530 to be provided as part of a first relatively thin layer in a plane in the first and third dimensions (illustrated as an x-z plane). In particular, the size or "height" of the first planar layer—in which the first replicator 520 is located—in the second dimension (illustrated as the y dimension) is reduced. The mirror 530 is configured to direct the light away from a first layer/plane, in which the first replicator 520 is located (i.e., the "first planar layer"), and direct it towards a second layer/plane, located above and substantially parallel to the first layer/plane, in which the second replicator 540 is located (i.e. a "second planar layer"). Accordingly, it may be said that the first planar layer containing the first replicator 520 and the mirror 530 is within the footprint of the second planar layer containing second replicator 540. Thus, the overall size or "height" of the system—comprising the first and second replicators 520, 540 and the mirror 530 located in the stacked first and second layers/planes in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

Two-dimensional Pupil Expansion—Example 2

British patent application GB2113454.9, filed 21 Sep. 2021 and incorporated herein by reference, discloses an image projector comprising a more advanced two-dimensional pupil expander may which be arranged in accordance with this disclosure.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces of the first waveguide pupil expander are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Thus, the light field size may be regarded as a cross sectional area of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be (optically) coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension may correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 (published as GB2607899A) and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the deliver of hologram light channels, and their replicas, to the eye-box. Each aperture or window may comprise a plurality of liquid crystal cells or pixels.

Planar Mirror Coupling Element

Figure 6:
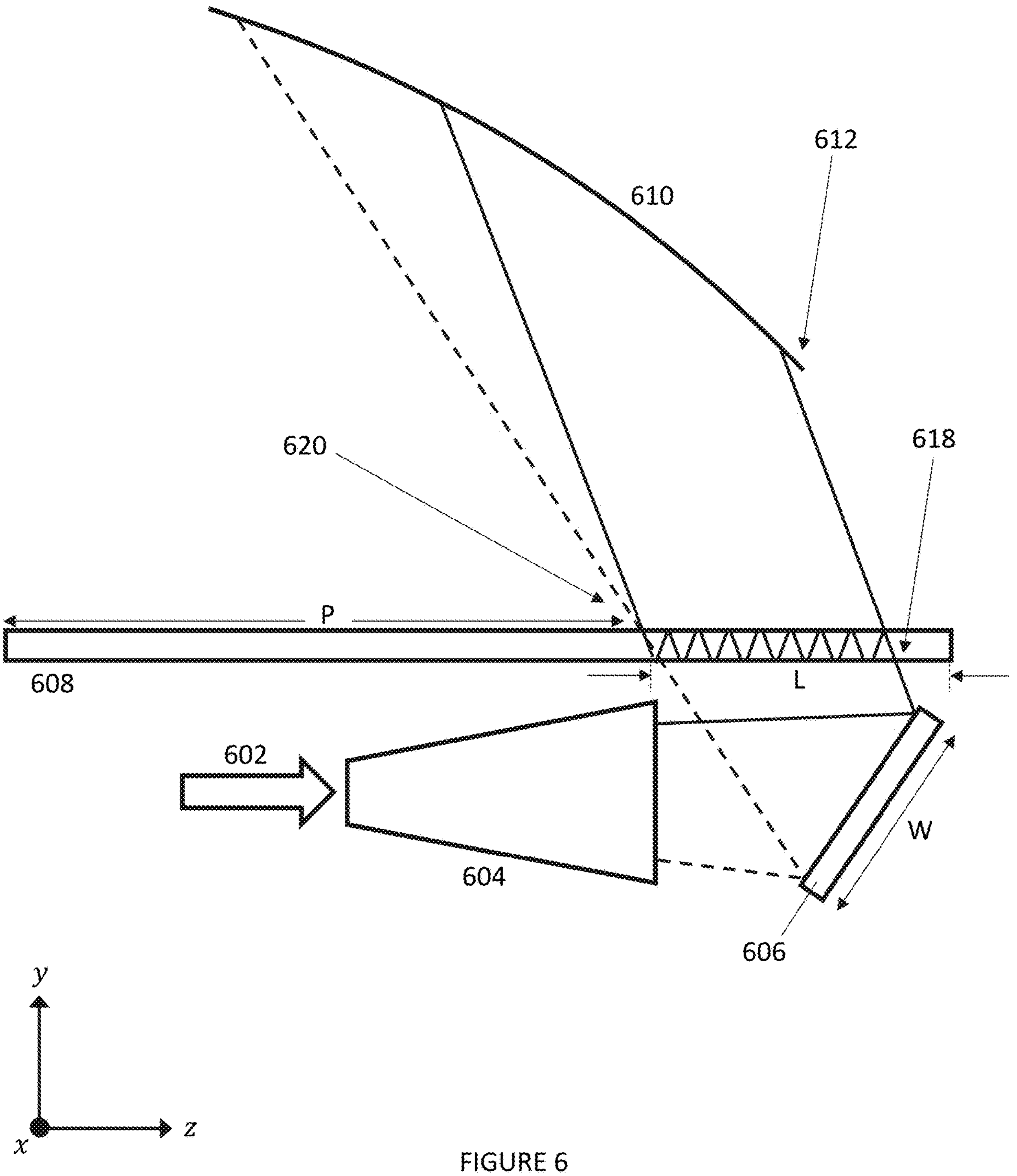
FIG. 6 shows a side view of the second example two-dimensional pupil expander arranged with an optical combiner of a head-up display.

FIG. 6 shows how a diffracted light field, in particular a diverging holographic light field, output by a first replicator is coupled into a second replicator of the second example two-dimensional pupil expander of FIG. 5B, in a display system comprising an optical combiner arranged to receive the output of the second replicator.

In particular, FIG. 6 shows a first replicator 604, a second replicator 608 and a planar/fold mirror 606. First and second replicators, 604, 608 comprises waveguide pupil expanders as described above. First replicator 604 is arranged to provide pupil expansion in a first direction (illustrated as the x dimension) such that its direction of elongation extends orthogonally to the drawing (i.e. in and out of the page). Second replicator 608 is arranged to provide pupil expansion in a second direction in a third dimension (illustrated as the z dimension). First replicator 604 receives a diverging input holographic light field 602, for example from a holographic display device such as an LCOS (not shown), at an input port at a proximal end thereof, wherein the first replicator 604 extends in a first direction in the first dimension (illustrated as the x dimension) from the proximal end to a distal end. A holographic light field comprising a one-dimensional array of replicas of the input holographic light field 602 is output along the length of the reflective-transmissive surface forming the output port of the first replicator 604 towards a planar/fold mirror 606. Since the light ray bundles of the holographic light field are diverging, the light field size increases in the second dimension (illustrated as the y dimension) from the input port to the output port of first replicator 604. It may be said that the holographic light field "expands" as it propagates along the length of first replicator 604. Accordingly, in the illustrated arrangement, first replicator 604 is tapered outwardly along its length (in the first direction—illustrated as a direction of the x dimension) from a minimum size at the proximal end to a maximum size at the distal end so as to accommodate the increasing size (in both directions of the second dimension—illustrated as they dimension) of the diverging light field (i.e., increasing cross-sectional area).

Planar mirror 606 is arranged to receive the one-dimensional array of replicas of the holographic light field output by first replicator 604. The size (footprint) of the mirror 606 is arranged to complement the size (footprint) of the output holographic light field of first replicator 604. Thus, the reflective surface of mirror 606 has a length substantially corresponding to at least the length of the first replicator 604, and a width W substantially corresponding to at least the width of the output port of first replicator 604 and, thus, the maximum size at the distal end thereof. Thus, the area of the reflective surface of mirror 606 is large enough to receive the full cross-sectional area of the incident holographic light field received from first replicator 604. The skilled person will appreciate that, in practice, the reflective surface of the mirror is sized to be slightly greater that the size of the output port of the first replicator 604 for this purpose, due to the divergence of the holographic light field and the tilt of mirror 606. As shown in FIG. 6, mirror 606 is arranged at an angle with respect to a propagation axis of the holographic light field received from the first replicator 604 so as to reflect the light in a direction to an input port 618 of second replicator 608. Thus, mirror 606 folds (or redirects) the optical path of the output light of the first replicator 604 towards the input port 618 of the second replicator 608.

In the illustrated arrangement, the input port 618 is at a first end of the second replicator 608, which is below a front/leading edge 612 of optical combiner 610. In particular, input port 618, having length L, is disposed at the first end adjacent the (fully) reflective surface of the pair of parallel reflective surfaces of the second replicator 608. The size (footprint) of the input port 618 of the second replicator 608 is arranged to complement the size (footprint) of the reflected holographic light field received from mirror 606. Accordingly, the length L of the input port 618 of the second replicator 608 (in the second direction—illustrated along the z dimension and corresponding to the direction of pupil expansion of the second replicator 608) may substantially equate to at least the width W of the mirror 606, depending upon the angle of tilt of mirror 606. Thus, the input port 618 is relatively large in the second direction—corresponding to the direction of pupil expansion of second replicator 608—due to the increased size of the holographic light field 602 resulting from reflection from angled mirror 606 and expansion as a result of propagation along the length of first replicator 604. In consequence, the holographic light field is coupled into the second replicator 608 over a relatively large distance L in the second direction (illustrated along the z dimension). This has a number of drawbacks.

First, the input port 618 comprises an optically transmissive entrance window adjacent or within one of the pair of parallel reflective surfaces for waveguiding. Thus, due to the relatively large distance L, some light rays entering the input port 618 of the second replicator 608 may be lost due to internal reflection back out through the input port 618 by the other one of the pair of parallel reflective surfaces. This reduces optical coupling efficiency. The loss of light by internal reflection out through the input port 618 may be reduced by using a reflective-transmissive element as the input port 618 as described in British Patent Application No: GB 2118613.5 filed on 21 Dec. 2021, which is incorporated herein by reference. In this case, at least a proportion of light of all the light rays that are incident on the input port 618 are fully coupled into the second replicator 608 by waveguiding along the part of its length having the input port 618. However, the reflective-transmissive element prevents a proportion of light rays entering through the input port 618 and still allows a (small) proportion of light rays to be internally reflected back out through the input port 618. Accordingly, even when using reflective-transmissive element to form the input port 618, the optical coupling efficiency is somewhat reduced. In summary, when coupling a light field into the second replicator 608, the optical coupling efficiency generally reduces as the length L of the input port 618 increases in the direction of pupil expansion by second replicator 608.

Secondly, light rays of a diffracted light field, in particular a diverging holographic light field, are incident on the input port 618 at a range of different angles, and so enter the second replicator 608 at different positions along the length of the input port 618. In particular, as shown by solid lines in FIG. 6, an example light ray incident at the highest angle on the mirror 606—closest to the second replicator 608—enters the input port 618 at a position adjacent the outer edge of the input port (i.e., adjacent the first/front end of the second replicator). Thus, a corresponding first light ray is emitted by the output port of second replicator 608 from a position close to the first/front end of the second replicator 608 to a position adjacent a front/leading edge 612 of the optical combiner 610. In the case that the input port 618 comprises a reflective-transmissive element, there is waveguiding of the light ray within the second replicator 608 along the length L of the input port 618 as shown by solid lines. Thus, corresponding replica light rays are emitted by the output port/surface of the second replicator 608 from positions corresponding to the full length of the input port thereof. However, as shown by dashed lines in FIG. 6, another example light ray incident at the lowest angle on the mirror 606—furthest from the second replicator 608—enters the input port 618 only at a position adjacent the inner edge of the input port 618. Thus, a corresponding first light ray is emitted by second replicator 608 from a position 620 on the output port that is displaced—by a distance greater than L—from the first/front end of the second replicator 608 and is incident at a corresponding position displaced (rearwardly) from the front/leading edge 612 of the optical combiner 610. In consequence, no corresponding replica light rays are emitted to positions near the front/leading edge 612 of the optical combiner 610. Accordingly, when the holographic light field comprises angular channels corresponding to different parts of the image, as disclosed herein, some image content is not delivered at positions near the front/leading edge 612 of the optical combiner 612. In consequence, the full angular content of the image is emitted from the output port of second replicator 608 at a range of positions P extending rearwardly from position 620 that is significantly displaced from the first/front end thereof. As the skilled reader will appreciate, the holographic light field emitted from the range of positions P along the length of the second replicator are received by the optical combiner at positions displaced from the front/leading edge 612 thereof, and propagated to a corresponding range of vertical eye-box positions. In consequence, the length of the second replicator 608 must be large enough in the second direction—corresponding to the direction of pupil expansion—so as to output the required number of replicas to propagate the full angular content to a range of positions for the required vertical size of the eye-box. This means that, when the holographic light field angularly separates the image content, the second replicator 608 of the arrangement shown in the drawings must be extended by at least length L, leading to a longer and less compact arrangement.

Optical Coupling Element

Figure 7:
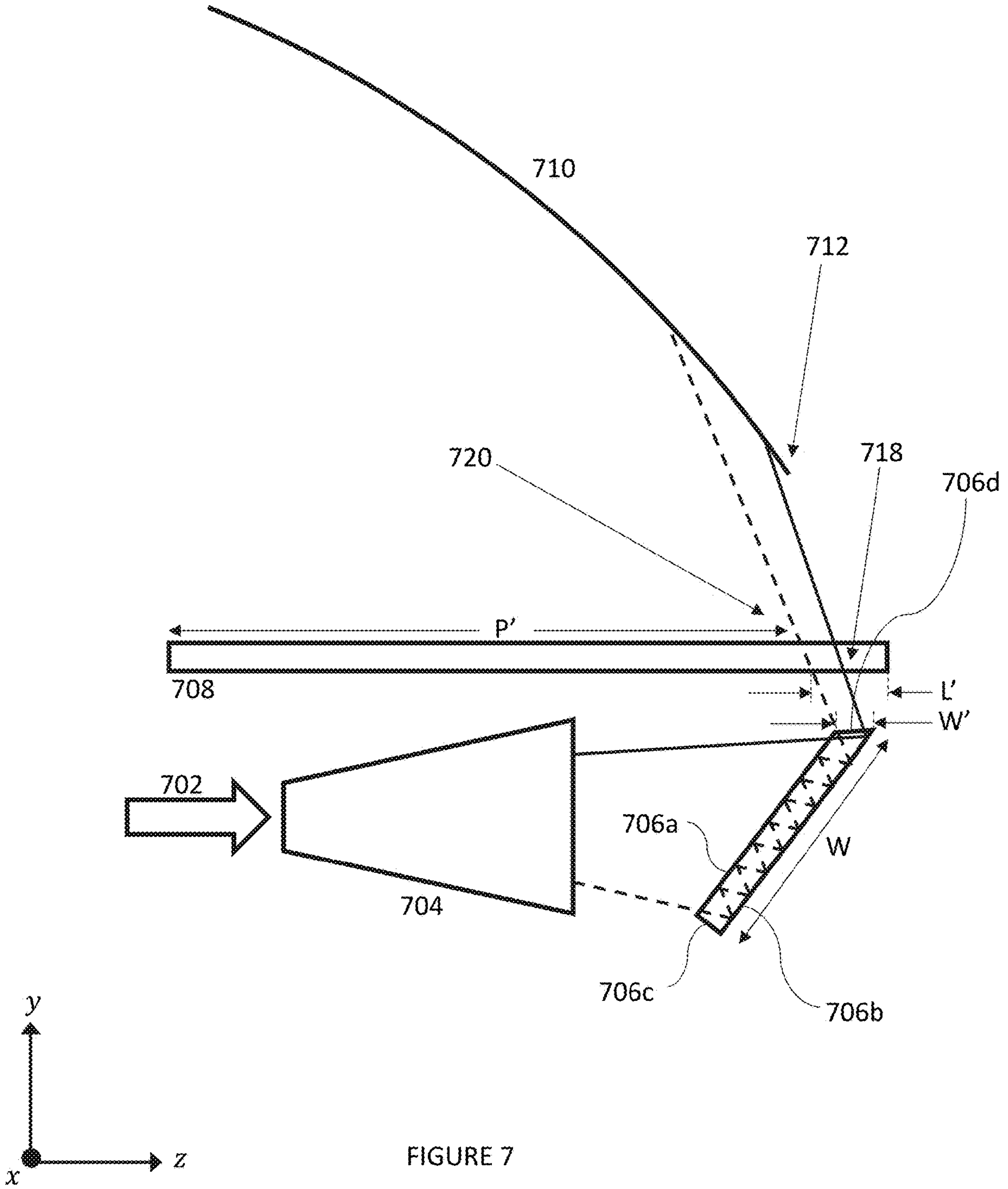
FIG. 7 shows a side view of a two-dimensional pupil expander comprising two replicators arranged with an optical combiner of a head-up display, in accordance with an embodiment of the present disclosure.

FIG. 7 shows how a diverging light field, in particular a diffracted or holographic light field, output by a first replicator is coupled into a second replicator of a two-dimensional pupil expander in accordance with an embodiment of the present disclosure, in a display system comprising an optical combiner arranged to receive the output of the second replicator.

In particular, FIG. 7 shows a first replicator 704, a second replicator 708 and a coupling element 706. The first and second replicators 704, 708 are waveguide pupil expanders corresponding to the first and second replicators of FIG. 6 and so are not described in detail below. However, the planar mirror 606 of FIG. 6 is replaced by a coupling element 706 for improved coupling of the holographic light field into the second replicator.

Coupling element 706 comprises a generally rectilinear optical element comprising first and second opposing major surfaces 706*a*, 706*b*. In the illustrated arrangement, the coupling element 706 is a solid optical element. Thus, coupling element 706 and also comprises first and second side surfaces (not shown in FIG. 7) and first and second end surfaces 706*c*, 706*d*. The first major surface 706*a* of coupling element 706 is reflective-transmissive so as to provide an input port of the coupling element 706. The coupling element 706 is arranged at an angle with respect to a propagation axis of the holographic light field received from the first replicator 704, similar to the angled orientation of the planar mirror 606 of FIG. 6. By virtue of the angled orientation of the coupling element 706, it may be said that the first end surface 706*c* is proximal and second end surface 706*d* is distal with respect to the first replicator 704. Thus, the first major surface 706*a* has a proximal end adjacent first end surface 706*c* and a distal end adjacent second end surface 706*d*. First major surface 706*a* is arranged to receive the one-dimensional array of replicas of the holographic light field output by first replicator 604. Accordingly, the size (footprint) of the first major surface 706*a* is arranged to complement the size (footprint) of the output holographic light field of first replicator 704. Thus, first major surface 706*a* has a length—corresponding to (at least) the length of the first replicator 704 in the first dimension (illustrated as the x dimension)—and a width W—largely corresponding to (at least) the width of the output port of first replicator 704 in the second dimension (illustrated as the y dimension). Thus, the area of the first major surface 706*a*, and therefore the input port, of coupling element 706 is large enough to receive the full cross-sectional area of the incident holographic light field received from first replicator 704. The skilled person will appreciate that, in practice, the area of the first major surface 706*a* is sized to be slightly greater that the size of the output port of the first replicator 704 for this purpose, due to the divergence of the holographic light field and the tilt of the coupling element 706.

The second major surface 706*b* of coupling element 706 is arranged parallel to the first major surface 706*a* and is reflective. Thus, light rays of the holographic light field output by first replicator 704 enter through the input port of the coupling element 706 and are waveguided between the first and second parallel major surfaces 706*a*, 706*b* by internal reflection in a direction from proximal first end surface 706*c* to distal second end surface 706*d*.

Thus, as shown in FIG. 7, a light ray incident at the lowest angle on the first major surface 706*a*—furthest from the second replicator 708—enters the input port of coupling element 706 at the proximal end thereof and is waveguided between first and second major surfaces 706*a*, 706*b* to the distal second end surface 706*d*, as shown by dashed line in FIG. 7. A light ray incident at the highest angle on the first major surface 706*a*—closest to the second replicator 708—enters the input port of coupling element 706 at the distal end thereof and may be reflected by second major surface 706*b* (with or without waveguiding) to the distal second end surface 706*d*, as shown by solid lines in FIG. 7. The skilled reader will appreciate that light rays incident at positions and angles between the illustrated highest and lowest angled light rays are similarly waveguided from an entry position at the input port between the first and second major surfaces 706*a*, 706*b* of the coupling element 706 to the distal second end surface 706*d*.

In some embodiments, the reflectivity of the reflective-transmissive first major surface 706*a* increases in a direction from its proximal end to its distal end or, conversely, the transmissivity decreases in a direction from the its proximal end to its distal end surface. It may be said that the reflectivity of reflective transmissive/first major surface 706*a* is graded along the length of the entry window, for example by forming a graded facet (i.e., graded surface coating). The graded reflectivity/transmissivity may be selected to ensure that light rays at all angles are fully coupled into the coupling element 706 and are output with substantially uniform intensity. Thus, the holographic light field coupled into the second replicator 708 may have substantially uniform intensity across its area. In particular, the graded reflectivity/transmissivity may compensate for the variation in transmission distance, and/or number and position of internal reflections or bounces at the reflective transmissive/first major surface 706*a*, through the coupling element 706 of light rays of the diverging holographic light field at different angles, such as the lowest angle example light ray shown by dashed line in FIG. 7 and the highest angle example light ray shown by solid line in FIG. 7. As the skilled reader will appreciate, such variations in transmission distance, and/or number and position of bounces, of different angled light rays of the holographic light field through the coupling element 706 may lead to intensity variations due to loss of light by partial reflection at the respective position of incidence at the entry window and/or partial transmission at the respective internal reflection/bounce position(s) out of the entry window. By selectively grading the reflectivity/transmissivity of the first major surface 706*a* from the first end to the second end thereof, it is possible for all the light rays of the holographic light field received at the distal second end surface 706*d* to have substantially the same intensity.

Second end surface 706*d* forms an output port of the coupling element 706. In other embodiments, the output port of the coupling element 706 may be formed elsewhere, such as in one of the first and second major surfaces 702*a*, 702*b* (e.g. at a position that is spatially separated from the position of incidence thereon of the highest angle example light ray of the received light field shown by solid line in FIG. 7). Thus, coupling element 706 folds (or redirects) the optical path of the output light field of the first replicator 704 towards an input port 718 of the second replicator 708. The second end surface 706 may be configured to direct the holographic light field in a desired direction towards the input port 718 of second replicator 708. Accordingly, second end surface 706*d* may be arranged at a non-orthogonal angle relative to first and second major surfaces 706*a*, 706*b*. In some example arrangements, the output port of the coupling element is prism. Thus, the second end surface 706*d* may be a suitably angled surface of a prism.

The size (footprint) of the second end surface 706*d* of coupling element 706 is reduced compared to the size (footprint) of the first major surface 706*a* of coupling element 706. In particular, the second end surface 706*d* has the same length but a reduced width W' when compared to the width W of first major surface 706*a* (i.e., W'<W). Thus, the size of the holographic light field (i.e., cross-sectional area) is reduced by the coupling element 706. It may be said that the coupling element 706 compresses the holographic light field into a smaller cross-sectional area. Since the compression of the holographic light field is in the dimension orthogonal to the first direction of pupil expansion by the first replicator 704 (illustrated as the x dimension), the coupling element 706 may be considered to compensate for the divergence of the holographic light field through first replicator 704.

The reduced size of the holographic light field enables the length L' of the input port 718 of the second replicator 708 to be reduced in the second direction (illustrated in the z dimension and corresponding of the pupil expansion of second replicator 708), as shown in FIG. 7. It may be said that the holographic light field may be coupled into the second replicator 708 over a shorter distance. Thus, in comparison to a coupling arrangement comprising a mirror as shown in FIG. 6, the coupling element 706 enables the length L' of the input port 718 to be reduced from length L in the second direction—the direction of pupil expansion—leading to improved optical coupling efficiency, as discussed above. In some example arrangements, the input port 718 of the second replicator 708 may comprise a reflective-transmissive element, as described above. The reflective-transmissive element may be graded along its length in order to further improve optical coupling efficiency; however, due to the reduced length of the input port 718, this is not essential.

Furthermore, due to its reduced length L', the inner edge of the input port 718 is closer to the first/front end of the second replicator 708. As shown by dashed line in FIG. 7, a light ray incident at the lowest angle on the first major surface 706*a*—furthest from the second replicator 708—is coupled by coupling element 706 into the input port 718 at the inner edge. Thus, a corresponding first light ray is emitted by second replicator 708 from a position 720 closer to the first/front end of the second replicator 708, and is incident at a corresponding position closer to the front/leading edge 712 of the optical combiner 710, compared to when using the planar mirror 608 as shown in FIG. 6. As shown by solid lines in FIG. 7, a light ray incident at the highest angle on the first major surface 706*a*—closest to from the second replicator 708—is coupled by coupling element 706 into the input port 718 near the outer edge thereof. A corresponding first light ray, and replica lights rays, are emitted from positions along the length of the input port 718, in the same way as described above with reference to FIG. 6. Since replicas of the lower angle light rays are formed closer to the first/front end of the second replicator 708, it is possible to reduce the length of the second replicator 708 whilst still forming the required number of replicas for the desired amount of pupil expansion in the second direction. Thus, the coupling element 706 also enables the length of the second replicator 708 to be reduced, leading to a more compact arrangement.

Accordingly, replicas of all the light rays of the holographic light field formed by the second replicator 708 are emitted from a range of positions P' extending rearwardly from position 720 that is closer to first/front end thereof compared to the range of positions P shown in FIG. 6. As the skilled reader will appreciate, the holographic light field emitted from the range of positions P' along the length of the second replicator is received by the optical combiner at positions displaced from the front/leading edge 612 thereof, and propagated to a corresponding range of vertical eye-box positions. Thus, when the hologram angularly divides the image content, as disclosed herein, light rays comprising all the angular content are emitted from a range of positions P' starting from position 720 that is closer to the first/front end of second replicator 708, to a corresponding range of positions at the optical combiner 710, from which the full angular content is propagated for the required vertical size of the eye-box. In consequence, the total length of second replicator 708 in the second direction—illustrated along the z dimension and corresponding to the direction of pupil expansion of the second replicator 608—is reduced compared to the second replicator 608 of the arrangement of FIG. 6.

Figure 8:
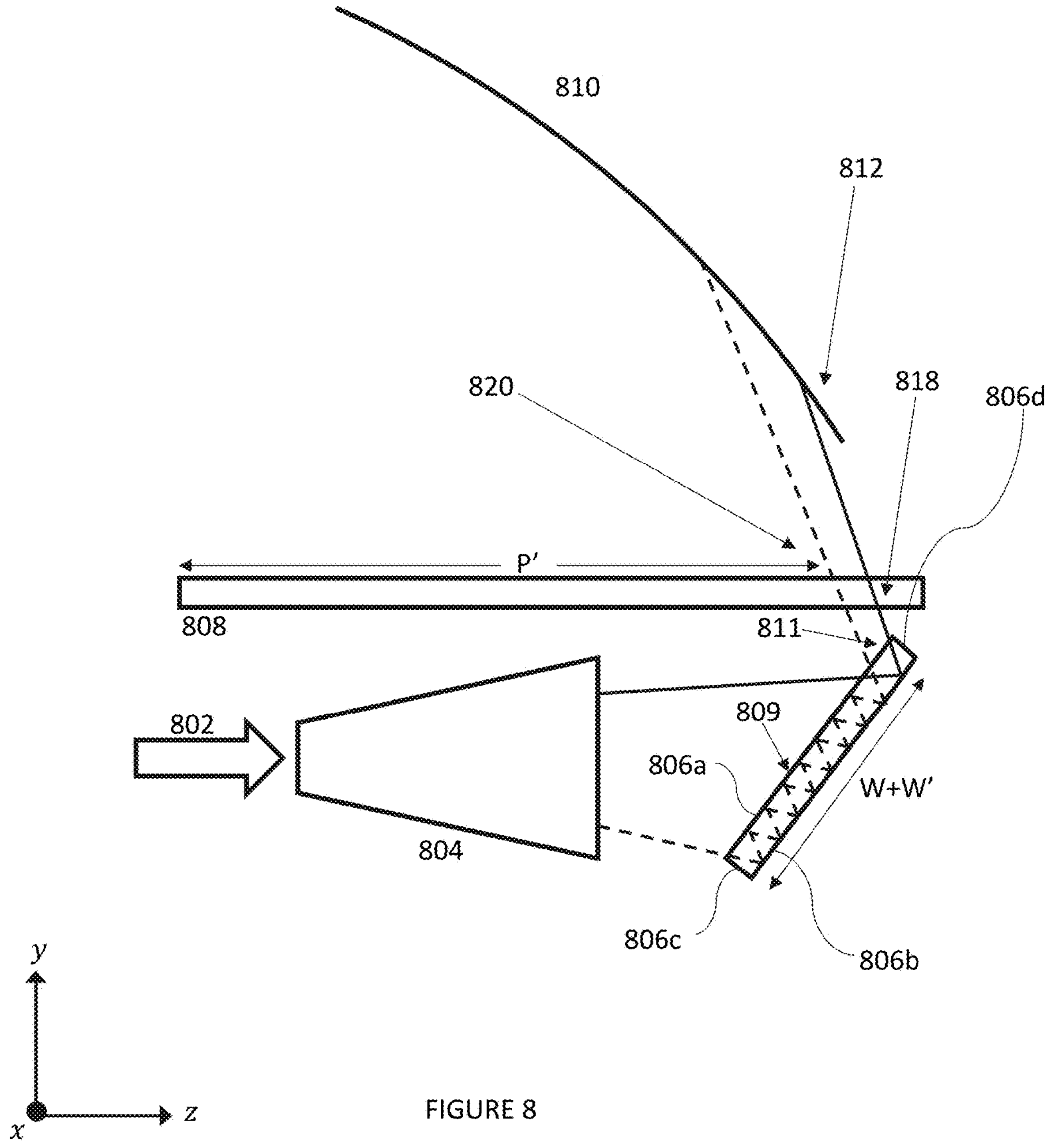
FIG. 8 shows a side view of a second example of a two-dimensional pupil expander comprising two replicators arranged with an optical combiner of a head-up display, in accordance with an embodiment of the present disclosure.

FIG. 8 shows a second example of a diverging light field, in particular a diffracted or holographic light field, output by a first replicator and coupled into a second replicator of a two-dimensional pupil expander in accordance with an embodiment of the present disclosure, in a display system comprising an optical combiner arranged to receive the output of the second replicator. In particular, FIG. 8 shows a first replicator 804, a second replicator 808 and a coupling element 806. The first and second replicators 804, 808 are waveguide pupil expanders corresponding to the first and second replicators of FIGS. 6 and 7 and so are not described in detail below and like features are numbered accordingly. However, the coupling element 706 of FIG. 7 (or planar mirror 606 of FIG. 6) is replaced by a second example of a coupling element 806. The difference between the (first example) coupling element 706 and the (second example) coupling element 806 is that, in the coupling element 806, the reflective transmissive first surface 806*a* comprises a first portion 809 forming the input port of the coupling element 806 and a second portion 811 forming the output port of the coupling element 806. In other words, the same surface (first surface 806*a*) forms both the input port and the output in coupling element 806. In this example, the first and second portions of the first surface 806*a* are adjacent one another and to do not overlap.

Because the first surface 806*a* forms both the input port and the output port, the first surface 806*a* is larger than the first surface 706*a*. In particular, the first portion of the first major surface 806*a* has a length—corresponding to (at least) the length of the first replicator 804 in the first dimension (illustrated as the x dimension)—and a width W—largely corresponding to (at least) the width of the output port of first replicator 804 in the second dimension (illustrated as they dimension). Thus, the area of the first portion of the first major surface 806*a*, and therefore the input port, of coupling element 806 is large enough to receive the full cross-sectional area of the incident holographic light field received from first replicator 804. The size (footprint) of the second portion 811 of the first major surface 806*a* is reduced compared to the size (footprint) of the first portion 809 of the major surface 806*a* of coupling element 806. Thus, the size of the holographic light field (i.e., cross-sectional area) is reduced by the coupling element 706. Furthermore, the width of the first major surface 806*a* may be said to be substantially equal to the sum of the widths of the first and second portions (i.e. W+W'). It may be said that the coupling element 806 compresses the holographic light field into a smaller cross-sectional area. Since the compression of the holographic light field is in the dimension orthogonal to the first direction of pupil expansion by the first replicator 804 (illustrated as the x dimension), the coupling element 806 may be considered to compensate for the divergence of the holographic light field through first replicator 804.

The coupling element 806 advantageously has a simpler geometry than the coupling element 706 because the coupling element 806 may have a rectangular (rather than trapezoidal geometry). This may remove the need to provide a chamfered edge on the coupling element, for example. However, this is at the expense of the overall system having a greater packing size. In particular, the increased length of the coupling element 806 (compared to the coupling element 706) may increase the packing height of a system comprising the coupling element 806 (compared to the coupling element 706).

Figure 9:
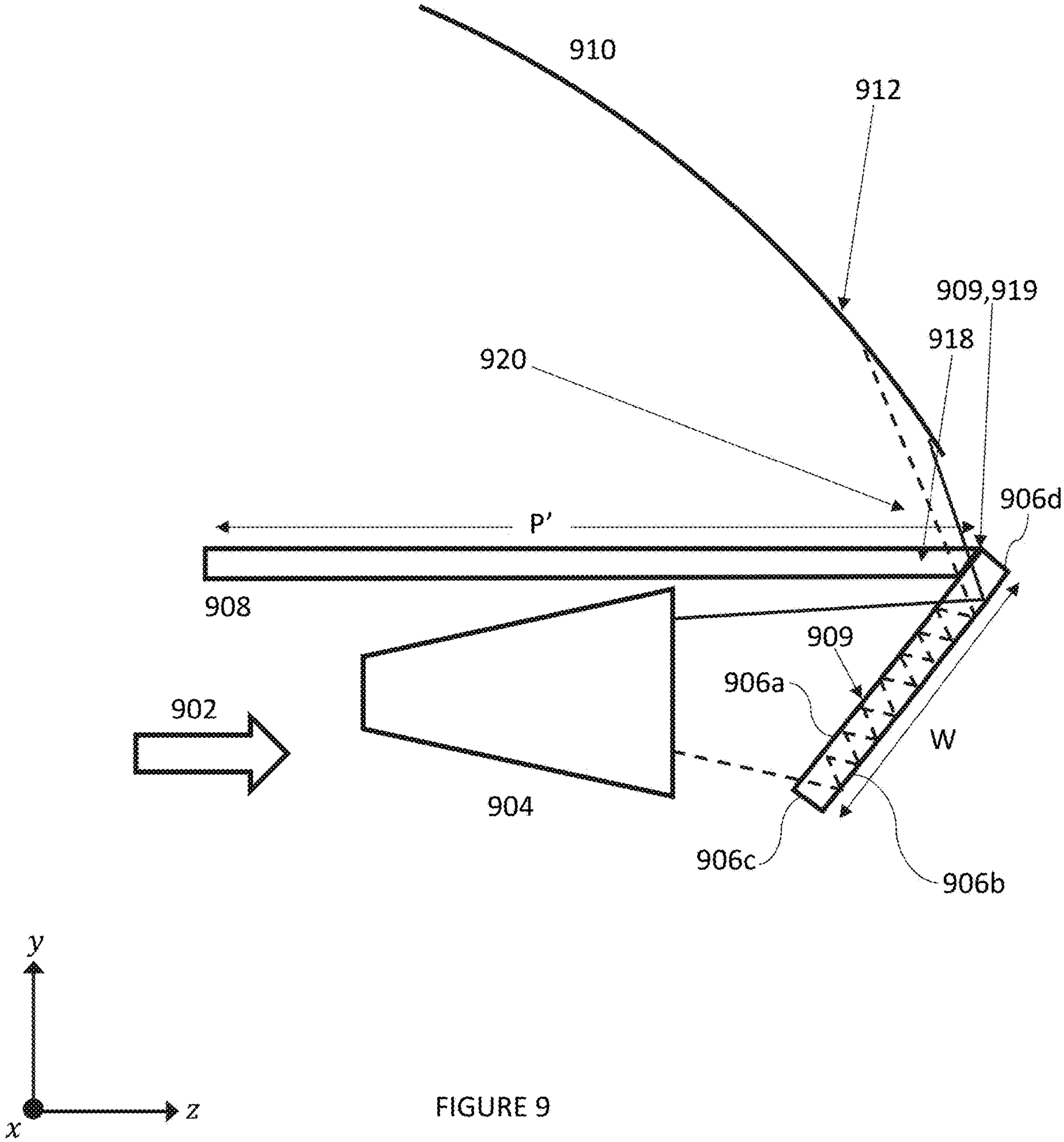
FIG. 9 shows a side view of a third example of a two-dimensional pupil expander comprising two replicators arranged with an optical combiner of a head-up display, in accordance with an embodiment of the present disclosure.

FIG. 9 shows a third example of a diverging light field, in particular a diffracted or holographic light field, output by a first replicator and coupled into a second replicator of a two-dimensional pupil expander in accordance with an embodiment of the present disclosure, in a display system comprising an optical combiner arranged to receive the output of the second replicator. In particular, FIG. 9 shows a first replicator 904, a second replicator 908 and a coupling element 906. The first replicator 804 and the coupling element 906 are the same as shown in FIG. 8 and so are not described in detail below and like features are numbered accordingly. The second replicator 908 is similar to the second replicator 808 of FIG. 8 (and 7) but differs in that the second replicator 908 comprises a chamfered edge/end (at the end closest to the coupling element 906) forming an end face 919. The end face 919 forms the input port of the second replicator 908 in this example. The output port 911 of the coupling element 906 abuts the input port/end face 919 of the second replicator 908. An advantage of the example of FIG. 9 is that the packing height of the system (in the y-direction) is reduced (relative to the example of FIG. 8). However, this is at the expense of increasing the complexity of the geometry of the second replicator 908 (because of the introduction of the chamfered edge).

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A display system comprising:

a first replicator arranged to receive a holographic light field and replicate the holographic light field in a first direction, wherein the holographic light field is diverging;

a coupler comprising: a reflective-transmissive surface arranged to receive the output of the first replicator; and a reflective surface opposing the reflective-transmissive surface in order to guide at least a portion of the holographic light field by internal reflection therebetween to an output port of the coupler in order to reduce the size of the holographic light field in a second direction; and a second replicator having an input port arranged to receive the output of the coupler and replicate the holographic light field in the second direction, wherein the second direction is perpendicular to the first direction.

2. The display system as claimed in claim 1, wherein the reflective-transmissive surface is a first major surface of the coupler and the output port is an end surface of the coupler.

3. The display system as claimed in claim 1, wherein the coupler is angled with respect to a propagation axis of the holographic light field received from the first replicator such that the reflective-transmissive surface of the coupler has a proximal end and distal end with respect to the first replicator.

4. The display system as claimed in claim 3, wherein the reflectivity and/or transmissivity of the reflective-transmissive surface of the coupler is graded.

5. The display system as claimed in claim 4, wherein the reflectivity increases from the proximal end to the distal end and/or the transmissivity decreases from the proximal end to the distal end.

6. The display system as claimed in claim 1, wherein the reflective-transmissive surface of the coupler substantially corresponds in size to a cross sectional area of the holographic light field incident thereon.

7. The display system as claimed in claim 1, wherein the input port of the second replicator is reflective-transmissive.

8. The display system as claimed in claim 1, wherein the output port of the coupler comprises a prism.

9. The display system as claimed in claim 1, wherein each replicator comprises a pair of opposing surfaces arranged to waveguide therebetween by internal reflection.

10. The display system as claimed in claim 1, wherein the first replicator is tapered along its length.

11. The display system as claimed in claim 1, wherein the second replicator is substantially planar, and the first replicator and coupler are substantially arranged in a layer within the footprint of the second replicator.

12. The display system as claimed in claim 1, wherein the first direction and second direction correspond to dimensions of an eye-box of the display system.

13. The display system as claimed in claim 1, further comprising a display device arranged to display a hologram and a light source arranged to illuminate the displayed hologram in order to form the holographic light field.

14. A head-up display comprising the display system of claim 1.

15. A method for image projection, the method comprising:

providing a holographic light field;

replicating the holographic light field in a first direction, wherein the holographic light field is diverging;

providing a coupler comprising a reflective-transmissive surface; and a reflective surface opposing the reflective-transmissive surface;

receiving the replicated holographic light field at the reflective-transmissive surface of the coupler;

guiding at least a portion of the replicated holographic light field by internal reflection between a reflective-transmissive surface of the coupler and the reflective surface of the coupler to an output port of the coupler, thereby reducing the size of the replicated holographic light field in a second direction perpendicular to the first direction;

outputting the reduced holographic light field from the coupler; and replicating the reduced holographic light field in the second direction.

16. The method as claimed in claim 15, wherein the reflective-transmissive surface is a first major surface of the coupler and the output port is an end surface of the coupler.

17. The method as claimed in claim 15 wherein the reflectivity and/or transmissivity of the reflective-transmissive surface of the coupler is graded.

18. The method as claimed in claim 15, wherein the replication of the holographic light field in the first direction and the replication of the holographic light field in the second direction are each performed using a replicator comprising a pair of opposing surfaces arranged to waveguide therebetween by internal reflection.

19. A display system comprising:

a first replicator arranged to receive a holographic light field and replicate the holographic light field in a first direction, wherein the holographic light field is diverging in a second direction perpendicular to the first direction;

a coupler comprising: a reflective-transmissive surface arranged to receive from the output of the first replicator an input holographic light field having a size in the second direction; and a reflective surface opposing the reflective-transmissive surface in order to guide at least a portion of the holographic light field by internal reflection therebetween to an output port of the coupler in order provide at the output port an output holographic light field having a size in the second direction that is smaller than the size in the second direction of the input holographic light field;

a second replicator having an input port arranged to receive the output holographic light field from the coupler and replicate the output holographic light field in the second direction.

* * * * *